United States Patent [19]  [11] 3,755,256
Beverly  [45] Aug. 28, 1973

[54] AROMATIC POLYSULPHONES CONTAINING PHOSPHORUS COMPOUNDS TO INCREASE MELT STABILITY

[75] Inventor: Gordon Maxwell Beverly, Welwyn Carden City, England

[73] Assignee: Imperial Chemical Industries Limited, Millbank, London, England

[22] Filed: Feb. 25, 1972

[21] Appl. No.: 229,507

[30] Foreign Application Priority Data
Mar. 10, 1971  Great Britain .................... 6,458/71
Jan. 18, 1972  Great Britain .................... 2,347/72

[52] U.S. Cl. ............... 260/49, 260/45.7 P, 260/79, 260/823, 260/857 R, 264/331
[51] Int. Cl. ........................................... C08g 23/00
[58] Field of Search ..................... 260/49, 79, 79.3, 260/30.6, 37 R, 45.7 P; 264/331

[56] References Cited
UNITED STATES PATENTS
3,594,446  7/1971  Gabler et al. .................... 260/823
3,332,909  7/1967  Farnham et al. ................. 260/47
3,565,862  2/1971  Campbell et al. ................ 260/49
3,431,230  3/1969  Jackson, Jr. et al. ............ 260/33.8
3,635,890  1/1972  Takemura et al. ............... 260/47

Primary Examiner—William H. Short
Assistant Examiner—L. L. Lee
Attorney—Cushman, Darby & Cushman

[57] ABSTRACT

A thermoplastic composition comprising (a) 96 to 99.9 percent by weight of at least one aromatic polysulphone and (b) 4 to 0.01 percent by weight of at least one phosphorus compound having the formula $Y_3PQ$ in which Y is a univalent organic radical which may be the same or different and Q is oxygen or sulphur.

6 Claims, No Drawings

AROMATIC POLYSULPHONES CONTAINING PHOSPHORUS COMPOUNDS TO INCREASE MELT STABILITY

This invention relates to thermoplastic polymer compositions and in particular to aromatic polysulphones having improved thermal stability.

Aromatic polysulphones and methods for making them are described in British Patent Specifications Nos. 1,016,245; 1,060,546; 1,078,234; 1,109,842; 1,122,192; 1,133,561; 1,153,035; 1,153,528; 1,177,183 and 1,234,301, Belgian Patent Specification No. 741,965, Canadian Patent Specification No. 847,963, Dutch Patent Specification No. 70/11346 and Swiss Patent Specification No. 491,981. They are generally thermoplastic materials of high softening point. Owing to their high softening point, and generally rather high melt viscosities at even higher temperatures, the aromatic polysulphones may tend to decompose as evidenced by an increase in melt viscosity or a darkening in colour unless precautions are taken to stabilise the polymer.

It has now been found that aromatic polysulphones and their blends can be mixed with organic phosphorus compounds to form compositions having improved thermal stability.

According to the present invention a thermoplastic composition is provided comprising (a) 96 to 99.99 percent by weight of at least one aromatic polysulphone and (b) 4 to 0.01 percent by weight of at least one organic phosphorus compound having the formula $Y_3PQ$ in which Y is a univalent organic radical as hereinafter defined which may be the same or different and Q is oxygen or sulphur.

The aromatic polysulphones described in the above-mentioned British specifications comprise repeating units of the formula $$-Ar-SO_2-$$

in which Ar is a bivalent aromatic radical and may vary from unit to unit in the polymer chain (so as to form copolymers of various kinds). Thermoplastic polysulphones generally have at least some units of the structure

in which Z is oxygen or the residue of an aromatic diol such as 4,4'-bisphenol. One example of such a polysulphone has repeating units of the formula

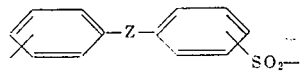

and others (which are commercially available in the United States of America) are said to have repeating units of the formula

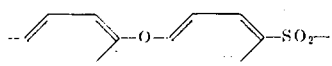

(Union Carbide Corporation) or copolymerised units in various proportions of the formulae

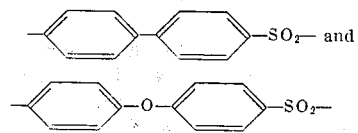

(Minnesota Mining and Manufacturing Company). Another group of aromatic polysulphones has repeating units of the formula

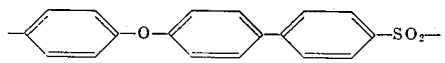

alone or copolymerised with any of the above units.

The organic phosphorus compound has the formula $Y_3PQ$ where Y is R or OR in which R is any univalent alkyl, aryl, aralkyl, alkaryl or alicyclic group consisting of up to 20 carbon atoms and Q is oxygen or sulphur. The groups Y may be the same or different in any organic phosphorus compound.

The compositions of the invention may be made by mixing the organic phosphorus compound with the molten polymer by, for example, extrusion or in a sigma-bladed mixer or in a two-roll mill, or by mixing an aqueous solution of the phosphorus compound with powdered polymer followed by drying.

The aromatic polysulphone may be blended with other thermoplastic polymeric substances such as, for example, polyesters, polyolefines, polyamides and polyvinyl chloride. The composition may be further mixed with particles of other polymeric materials having special properties, e.g. elastomeric materials and polytetrafluoroethylene. They may contain reinforcing fillers, for example glass, asbestos and carbon fibres, and other materials conferring various desired characteristics, e.g. solid lubricants (e.g. graphite or molybdenum disulphide), abrasives (e.g. carborundum), friction-conferring materials, magnetic materials (e.g. for recording tapes), photosensitisers, and any other materials for which the compositions of the invention make suitable vehicles. The compositions may contain dyes and pigments. The compositions may be fabricated in any desired form, such as fibre, film and mouldings or extruded products of any desired shape.

Incorporation of 0.01 to 4 percent by weight of organic phosphorus compound reduces the tendency of the melt viscosity and colour to increase on prolonged heating of the aromatic polysulphone and its blends. Inclusion of greater quantities appears to have little further effect and may lead to unacceptable opacity in otherwise essentially transparent compositions. A preferred level of inclusion of organic phosphorus compound is 0.01 to 2 percent by weight.

The invention is illustrated by the following examples.

Thermal stability was measured as the increase in melt viscosity (expressed as a percentage) as measured on a ram extruder having a barrel temperature of 380°C or 400°C.

EXAMPLE 1

Aromatic polysulphone (100 g) consisting essentially of repeating units of the formula

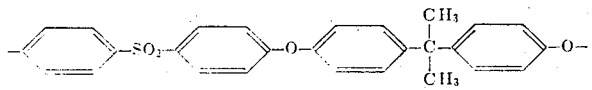

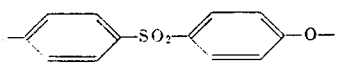

made in a manner similar to that described in Example 3 of British Specification No. 1,153,035 but having a reduce viscosity of 0.48 as measured at 25°C on a solution in dimethyl formamide of 1 g polymer in 100 cm³ of solution was stirred into a solution of triphenyl phosphate [(PhO)₃PO; 0.5 g] in 190 cm³ of methanol. The mixture was partially dried on a rotary evaporator for 30 minutes at 40°C and finally dried for 20 hours at 150°C. The resulting composition was compression-moulded at 320°C.

The composition showed no increase in melt viscosity after heating at 380°C for 90 minutes whilst untreated polymer showed a 50 percent increase in melt viscosity and a darker colour after same heat treatment.

EXAMPLE 2

In a series of experiments, organic phosphorus compound (0.1 g) was dissolved in a solvent (100 cm³) and mixed with aromatic polysulphone (100 g) similar to that described in Example 1 but having a reduced viscosity of 0.50. The mixture was partially dried on a rotary evaporator for 30 minutes at 40°C and finally dried in an oven for 20 hours at 150°C. Resulting compositions were compression-moulded at 320°C.

The compression-mouldings were granulated and fed into a ram extruder for evaluation of heat stability. The results of melt viscosity examination are presented in the table below together with details of phosphorus compound and solvent used in the mixing stage.

TABLE

| Phosphorus Compound | Solvent | Increase in Melt Viscosity 80 minutes at 400°C(%) |
|---|---|---|
| None | None | 80 |
| Triphenylphosphine oxide Ph₃PO | Methanol | 50 |
| Triphenylphosphine sulphide Ph₃PS | Acetone/methanol ½ v/v | 35 |
| Tritolyl phosphate (Me.PhO)₃PO | Methanol | 35 |
| Tri-p-tolyl thiophosphate (p-MePhO)₃PS | Acetone/methanol ½ v/v | 50 |
| Tri(p-bromophenyl) phosphate (p-BrPhO)₃PO | Ethanol | 30 |

EXAMPLE 3

Aromatic polysulphone (20 g) similar to that described in Example 1 but having reduced viscosity of 0.41 was stirred into a solution of trioctyl phosphate (0.2 g) in methanol (200 cm³). The mixture was partially dried on a rotary evaporator for 30 minutes at 60°C and finally dried for 60 hours at 120°C. The resulting dry composition was compression-moulded at 320°C.

The compression-moulding was granulated and fed into a ram extruder. The melt viscosity increased by 35 percent over 70 minutes at 400°C whereas polymer containing no trioctyl phosphate showed a 90 percent increase in melt viscosity and a darker colour after the same heat treatment.

EXAMPLE 4

Finely divided triphenyl phosphate (0.1 g) was sprinkled over granules (3 mm long; 3 mm diameter) of "Polysulphone" 1700 (Union Carbide Corporation) (16 g) said to have repeating units of the formula

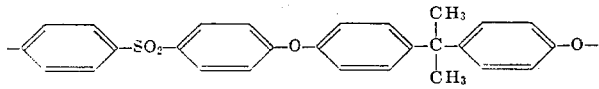

in a mould and the mixture was compression-moulded at 320°C for 5 minutes.

The compression-moulding was granulated and fed into a ram extruder. There was no increase in melt viscosity after 95 minutes at 400°C whilst after 130 minutes the melt viscosity had decreased by 35 percent and the extrudate still had good colour. A similar compression-moulding but containing no triphenyl phosphate showed a 25 percent increase in melt viscosity after 95 minutes at 400°C whereas after 130 minutes the polymer was black and solid and unable to be extruded.

I claim:

1. A thermoplastic aromatic polysulphone composition of improved melt stability comprising (a) 96 to 99.99 percent by weight of at least one aromatic polysulphone having repeating units of the formula —Ar-SO₂— in which Ar is a bivalent aromatic radical linked directly to the —SO₂— group through aromatic carbon atoms and may vary from unit to unit in the polymer chain and (b) 4 to 0.01 percent by weight of at least one phosphorous compound which improves the melt stability of said polysulphone, said compound having the formula Y₃PQ in which Y is R or a group having the formula RO where R is a univalent alkyl, aryl, aralkyl, alkaryl or alicyclic group consisting of up to 20 carbon atoms and Q is oxygen or sulphur.

2. A thermoplastic composition according to claim 1 in which Y is a group having the formula RO where R is an univalent alkyl, aryl, aralkyl, alkaryl or alicyclic group consisting of up to 20 carbon atoms and Q is oxygen.

3. A thermoplastic composition according to claim 1 in which the phosphorus compound is triphenyl phosphate.

4. A thermoplastic composition according to claim 1 in which the aromatic polysulphone has repeating units of the formula

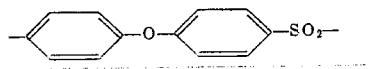

5. A thermoplastic composition according to claim 1 in which the aromatic polysulphone has repeating units of the formula

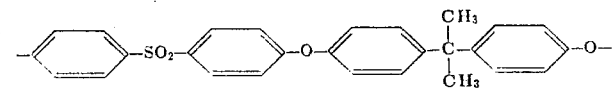

6. A thermoplastic composition according to claim 1 in the form of a moulded article.

* * * * *